(12) United States Patent
Lundberg et al.

(10) Patent No.: US 7,727,133 B2
(45) Date of Patent: Jun. 1, 2010

(54) SEALING DEVICE

(75) Inventors: Jörgen T. Lundberg, Sundsvall (SE); Fredrik Pontén, Sundsvall (SE)

(73) Assignee: Metso Paper, Inc. (FI)

( * ) Notice: Subject to any disclaimer, the term of this patent is extended or adjusted under 35 U.S.C. 154(b) by 1381 days.

(21) Appl. No.: 10/539,511

(22) PCT Filed: Oct. 29, 2003

(86) PCT No.: PCT/SE03/01671

§ 371 (c)(1), (2), (4) Date: Jun. 17, 2005

(87) PCT Pub. No.: WO2004/057102

PCT Pub. Date: Jul. 8, 2004

(65) Prior Publication Data

US 2006/0244220 A1 Nov. 2, 2006

(30) Foreign Application Priority Data

Dec. 20, 2002 (SE) .................................... 0203879

(51) Int. Cl.
*F16C 13/00* (2006.01)
*B01D 33/067* (2006.01)

(52) U.S. Cl. .............................. 492/15; 492/20; 492/47; 492/53; 277/391; 277/392; 277/370; 277/379; 277/385; 210/326; 210/396; 210/397; 210/398; 210/402; 162/371; 162/60

(58) Field of Classification Search ................... 492/15, 492/17, 18, 20, 26, 47, 53; 277/391, 392, 277/370, 379, 385; 210/326, 396, 397, 398, 210/402; 162/371, 60
See application file for complete search history.

(56) References Cited

U.S. PATENT DOCUMENTS 2,262,687 A * 11/1941 Little .......................... 277/432
6,065,608 A 5/2000 Frykhult

FOREIGN PATENT DOCUMENTS

| SE | 501 719 C2 | 5/1995 |
| SE | 504 011 C2 | 10/1996 |
| SE | 515 543 C2 | 8/2001 |
| WO | WO-99/46025 A1 | 9/1999 |
| WO | WO-02/02204 A1 | 1/2002 |

* cited by examiner

*Primary Examiner*—David P Bryant
*Assistant Examiner*—Sarang Afzali

(57) ABSTRACT

Apparatus for creating a seal between an axle journal and a bearing housing is disclosed, particularly for use in apparatus for dewatering or washing material suspensions. The apparatus includes a stator ring, a pair of diagonally disposed guide pins supporting the stator ring with respect to the bearing housing so that the stator ring can be angled in a plane with respect to the pair of guide pins, a sealing ring for creating a seal between the stator ring and the axle journal, a bellows for creating a seal between the bearing housing and the stator ring, and at least one resilient member for urging the stator ring in abutment against the sealing ring.

3 Claims, 3 Drawing Sheets

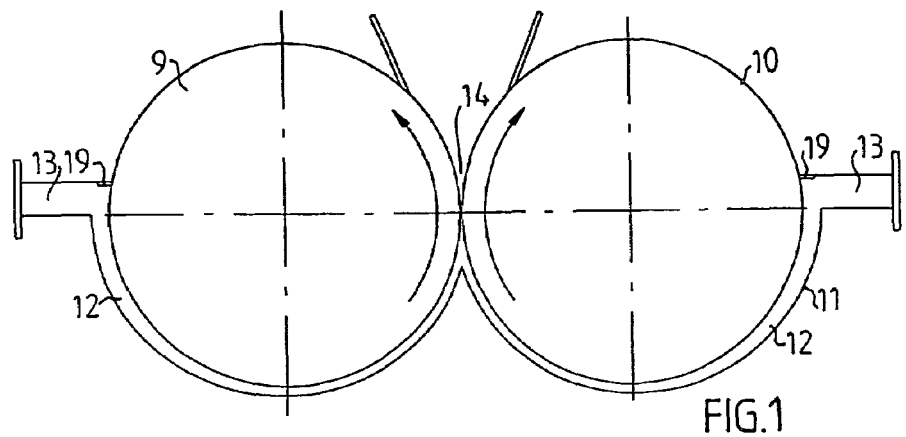
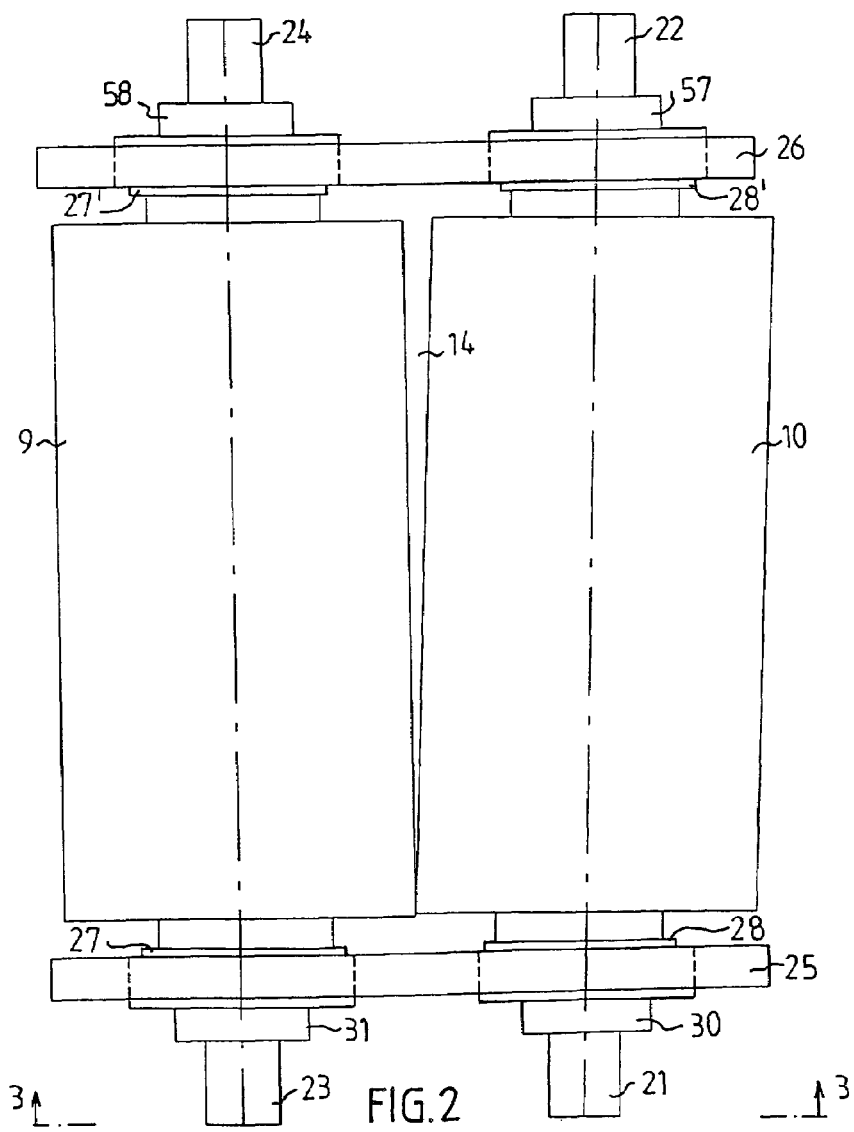

SEALING DEVICE

FIELD OF THE INVENTION

The present invention relates to a sealing device for sealing between a bearing housing and an axle journal of a roll, the two bearing housings for the axle journal bearings being movable in a direction across the axle.

The present invention also relates to a device for dewatering and/or washing material suspensions (for example pulp suspensions), comprising at least one cylindrical rotary roll, which is surrounded by a casing with an inlet for the material suspension, and which against an element forms an outlet gap for the egress of the material suspension, where the axle journals of the roll are mounted in bearings supported by bearing housings, which are movable for taking up variations in the width of the outlet gap, and sealing devices are provided for sealing between the bearing housing and the axle journals.

BACKGROUND OF THE INVENTION

The prior art, such as Swedish Patent Nos. 504,011; 515,543; and 501,719 show examples of dewatering devices, which comprise liquid permeable press rolls with a nip formed between them for dewatering a material suspension of wood fiber pulp. The pulp suspension is supplied to a portion of the device, which is under pressure and surrounded by a casing, and the dewatered pulp egresses through the nip. The pulp suspension usually is supplied either from above or from below, as can be seen from these references. The width of the outlet gap can vary, depending on the properties of the suspension which can be different along the length of the roll, and thus the roll can be angled in relation to the bearing housing. It may also be necessary to adjust the nip, i.e. to move at least one roll towards or away from the other roll, and during this movement the roll can be slightly angled. The pulp suspension is aggressive, and if it leaks into the bearings, the bearings will be destroyed. The sealing against the bearings, therefore, is of vital importance and an essential risk factor for the accessibility of the device.

Present dewatering devices use as sealing between the bearing housing and the axle stuffing boxes and V-ring sealings (of rubber). They do not withstand, however, the aggressive environment of the pulp suspension and are destroyed and lose their sealing capacity.

One object of the present invention is to provide a sealing device for sealing between a bearing housing and the axle journal of a roll, the two bearing housings of which for the axle journal bearings are movable in the direction across the axle, where this sealing device shall have a long service life even in an aggressive environment, and which allows the axle to be slightly angled in a plane during the movement, and in which the sealing can also take up a certain degree of axial movement. A more specific object of the present invention is, by providing improved sealing devices, to increase the operational reliability of a device for dewatering and/or washing material suspensions, comprising at least one cylindrical rotary roll, which is surrounded by a casing with an inlet for the material suspension, and which against an element forms a gap for the egress of pulp, and the axle journals of the roll are mounted in bearings supported by bearing housings movable in the direction across the axle.

SUMMARY OF THE INVENTION

These and other objects have now been realized by the discovery of apparatus for creating a seal between an axle journal and a bearing housing for the axle journal, the axle journal being angularly displaceable in a plane relative to the bearing housing, the apparatus comprising a stator ring, a pair of diagonally disposed guide pins supporting the stator ring with respect to the bearing housing whereby the stator ring can be angled in a plane with respect to the pair of guide pins, a sealing ring for creating a seal between the stator ring and the axle journal, a bellows for creating a seal between the bearing housing and the stator ring, and at least one resilient member for urging the stator ring in abutment against the sealing ring. Preferably, the bellows is rigidly mounted with respect to the stator ring and with respect to the bearing housing, the bellows comprising a non-resilient material. In another embodiment, the at least one resilient member is disposed to act between the bearing housing and the stator ring. In another embodiment, the sealing ring is mounted for rotation with the axle journal.

In accordance with the present invention, apparatus has also been discovered for dewatering or washing material suspensions comprising at least one cylindrical rotary roll including a pair of axle journals, the at least one cylindrical rotary roll separated by a predetermined gap from a second element, a trough surrounding the at least one cylindrical rotary roll, the trough including an inlet for the material suspension, an outlet for the material suspension comprising the predetermined gap, a pair of bearing housings, a pair of bearings supported by the pair of bearing housings, the pair of axle journals being mounted in the pair of bearings, the pair of bearing housings being individually movable whereby the at least one cylindrical rotary roll can be angularly displaced with respect to the pair of bearing housings, each of the pair of bearing housings including sealing means for creating a seal between the pair of bearing housings and the pair of axle journals, the sealing means comprising a stator ring, a pair of diagonally disposed guide pins supporting the stator ring with respect to the bearing housing, whereby the stator ring can be angled in a plane with respect to the pair of guide pins, a sealing ring for creating a seal between the stator ring and the axle journal, a bellows for creating a seal between the bearing housing and the stator ring, and at least one resilient member for urging the stator ring in abutment against the sealing ring. In a preferred embodiment, at least one of the at least one cylindrical rotary roll and the second element is liquid permeable. In another embodiment, the second element comprises a second cylindrical rotary roll.

BRIEF DESCRIPTION OF THE DRAWINGS

The present invention may be more fully appreciated with reference to the following detailed description, which in turn refers to the Figures, in which:

FIG. 1 is a front, elevational, cross-sectional, partially schematic view illustrating in principle a dewatering device for use in the pulp industry;

FIG. 2 is a top, elevational view of a pair of rolls with an intermediate gap in the device shown in FIG. 1;

DETAILED DESCRIPTION

Figure 4:
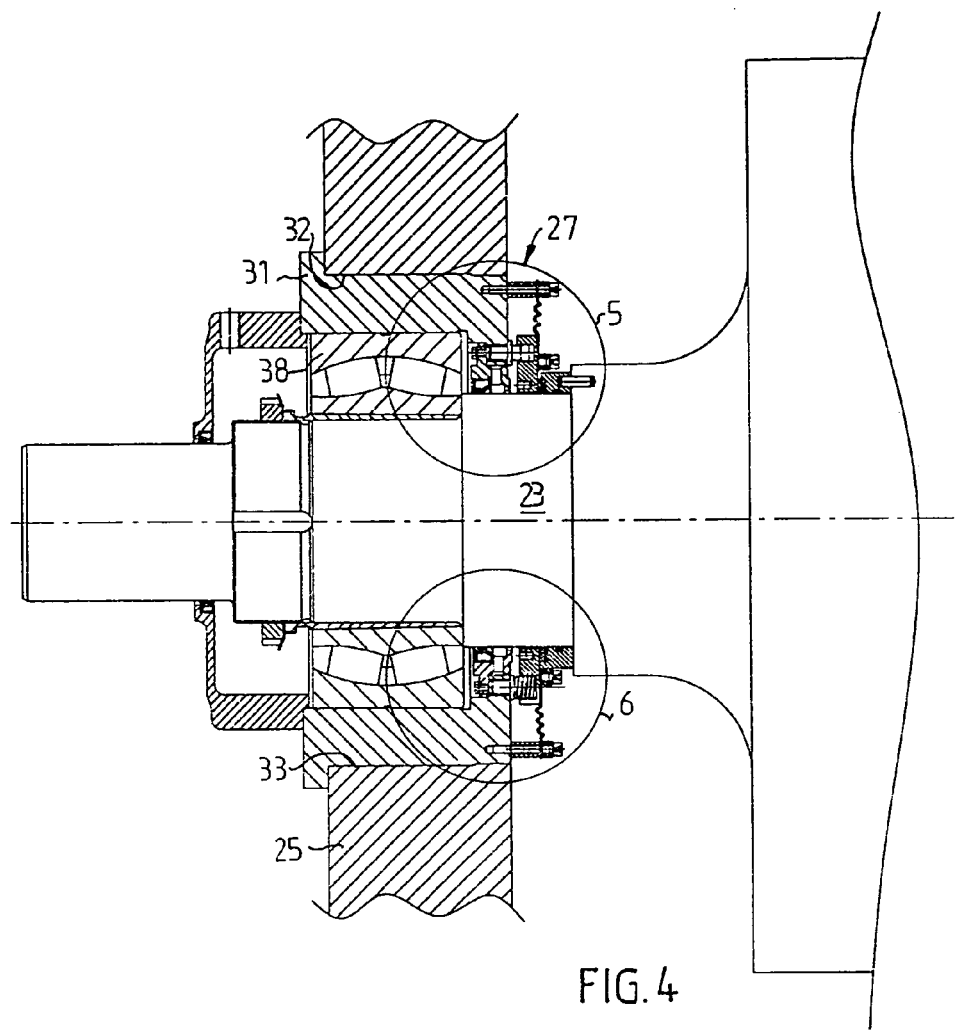
FIG. 4 is a partial front, enlarged longitudinal view taken through one axle journal bearing of a roll used in accordance with the present invention.

Turning to the Figures, FIG. 1 shows a roller press intended for liquid treatment, for example, for the washing and dewatering of material suspensions, such as, for example, fiber pulp suspensions. The roller press is described only roughly, because it is already known. Two cylindrical, rotary, liquid permeable rolls, 9 and 10, are partially located in a trough 11, which is formed so, that a converging space 12 is formed between the trough 11 and each of the rolls, 9 and 10. Each space 12 has an inlet 13 for the material suspension. Each space 12 can also have inlets for treatment liquid. Between the rolls, 9 and 10, a gap 14 is formed, a so-called press nip, through which the dewatered pulp passes. At the inlet 13 a longitudinal seal 19 is provided to seal between the trough 11 and the circumference of the rolls, 9 and 10, so that the trough 11 forms a tight casing about the lower portions of the rolls.

FIG. 2 shows schematically the two rolls, 9 and 10, with axle journals, 21, 22, 23 and 24, seen from above. The Figure also shows the end walls, 25 and 26, of the trough 11. In the end walls a bearing housing, 30 and 57 and 31 and 58, is provided for each of the axle journals, 21, 22, 23 and 24. The axle journals, 21, 22, 23 and 24, are mounted in bearings in the bearing housings, 30 and 57 and 31 and 58, and sealing devices, 27 and 27', and 28 and 28', respectively, seal between the axle journals and the bearing housings. The bearing housings for the axle journals are movable horizontally, so that the gap 14 between the rolls, 9 and 10, can be changed as will be described with reference to FIG. 3. The moving of the bearing housings, and thereby of the axle journals of the bearing housings, can take place individually, and during the moving, therefore, the roll can be angled in relation to the bearing housing, as shown in FIG. 2, and the width of the gap 14 will then temporarily not be equal along the entire roll length, as shown in FIG. 2. This subjects the sealing devices, 27, 27', 28 and 28', to large requirements.

Figure 3:
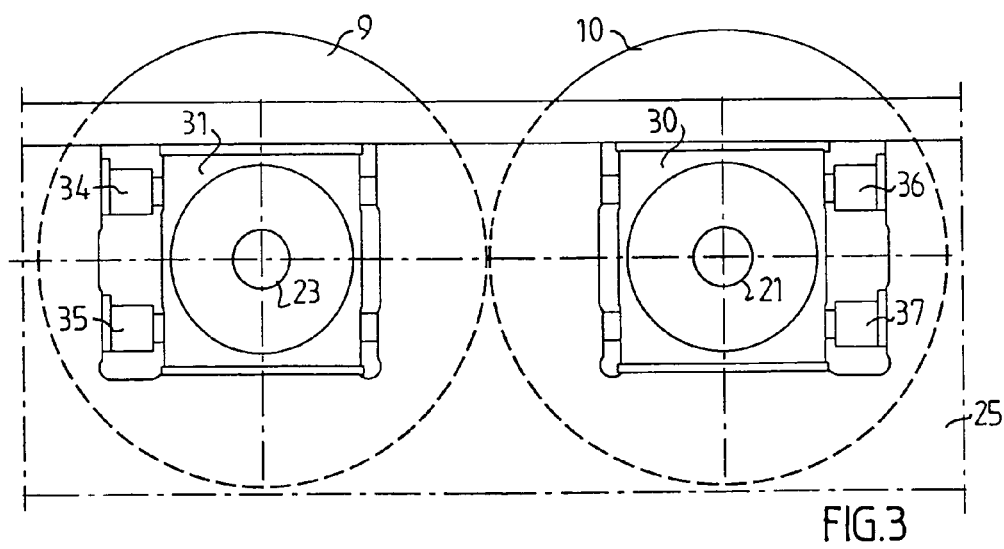
FIG. 3 is a front, elevational, enlarged sectional view of the rolls shown in FIG. 1 taken along line 3-3 thereof.

FIG. 3 shows the end wall 25 and two bearing housings, 30 and 31, which are horizontally slidable along guide surfaces, 32 and 33, in the end wall 25, as shown in FIG. 4. When the suspension passes the gap 14, a line load is obtained on the rolls. The line load can vary along the length of the gap and over time. This is due to the fact that the properties of the suspension vary, such as for example the fiber network. Considerable foreign matter can also enter the process and pass through the gap 14. Hydraulic cylinders, 34 and 35, and 36 and 37, respectively, are provided to prevent a pre-determined level of the line load to be exceeded. If this should happen, the dewatering arrangement can be damaged. The stroke length of the hydraulic cylinders can be, for example, 20 mm. The hydraulic cylinders for one roll, for example the hydraulic cylinders, 34 and 35, for the roll 9, can be replaced by stationary stops, if it is desired to guide the gap width (line load) by only one roll.

FIG. 4 shows the bearing housing 31 with one bearing 38 for the axle journal 23 and the sealing device 27, which seals between the bearing housing and the axle journal. The bearing in the embodiment shown is of a spherical type and, thus, can take up angle changes.

Figure 5:
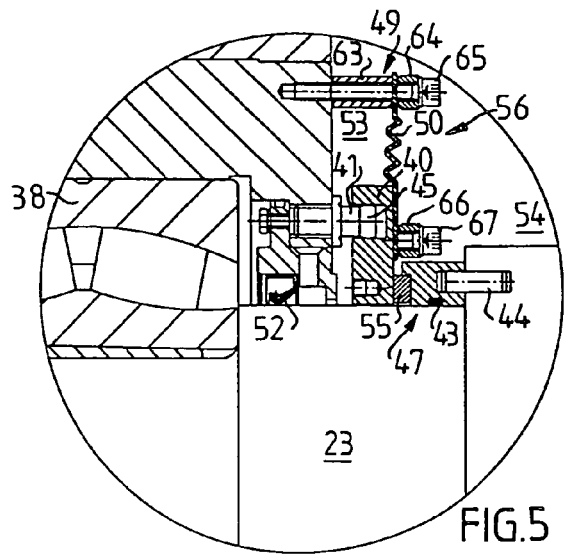
FIG. 5 is a side, elevational, partial, enlarged view of the circled portion shown in FIG. 3.
Figure 6:
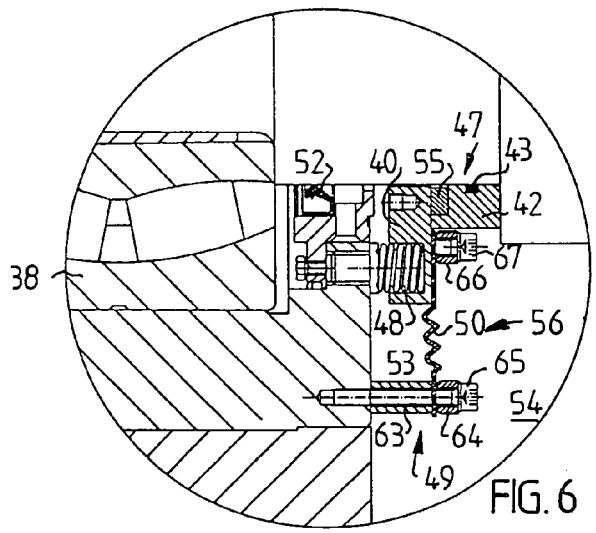
FIG. 6 is a front, elevational, enlarged sectional view of the circle portion shown in FIG. 3.

FIGS. 5 and 6 show on an enlarged scale the parts 5 and 6, respectively, in FIG. 4, with the sealing device 27. The sealing device 27 comprises a stator ring 40, which is supported, for example, by two guide pins 41, a sealing ring unit 47, a bellow means 56 and at least one resilient element (in the embodiment shown the resilient element is a spring).

The sealing ring unit 47 is intended to be tight-sealing against the axle journal 23, to rotate with the axle journal 23, and to seal against the stator ring 40. The sealing ring unit 47 in the embodiment shown comprises a holding ring 42, which is tight-sealing against the axle journal 23 with an O-ring 43 and rotates with the roll by carrying locking pins 44. The sealing ring unit 47 in the embodiment shown also comprises a sealing ring 55 of solid glide material, for example graphite, which is supported by the holding ring 42.

Figure 7:
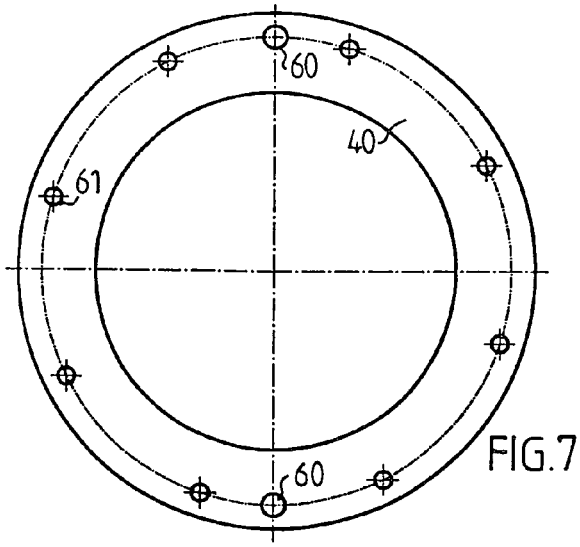
FIG. 7 is a front, elevational view showing a stator ring for use in the present invention.

FIG. 7 shows an illustration in principle of the stator ring 40 with two first recesses 60 for the guide pins 41 and eight second recesses 61 for the spring 48. The device shown thus comprises eight springs 48, but it may, of course, comprise a greater or smaller number of springs 48. The springs 48 are located in the bearing housing 31 and act against the stator ring 40. The springs 48 are intended to take up relative movements between the bearing housing 31 and the stator ring 40, and to ensure that the stator ring abuts against the sealing unit 47. The sealing can thus take up axial movement and can rise due to wear between rotary and stationary parts, and when different parts of the device are heated unequally rapidly, so that the parts will have a different heat expansion.

The guide pins 41 are arranged diagonally and vertically in relation to each other in the stator ring, and each guide pin 41 has at its front end a top 45. Each guide pin 41 is slidable in its recess 60 in the stator ring 40. The top 45 and recess 60 are formed in such a way in relation to each other that the stator ring 40 can be angled slightly in the horizontal plane. The top 45 suitably is spherical.

The bellow means 56 is intended to take up relative movements between the bearing housing 31 and the stator ring 40. The bellow means 56 is tightly attached to the stator ring and to the bearing housing 31, in order to seal therebetween, and comprises a bellows 50. The bellow means 56 in the embodiment shown comprises, for the attachment of the bellows 50 to the bearing housing, a bipartite outer ring 49 with a first ring portion 63, which is tightly attached to the bearing housing 31, and a second ring portion 64, and the bellows 50, which is ring-shaped, is clamped between the first and second ring portion, 63 and 64, by external fastening means 65, for example screws. The bellow means 56 further comprises an inner ring 66, which by inner fastening means 67 tightly clamps the bellows 50 against the stator ring 40. As the bellows is rigidly clamped at its outer edges (relative to the stator ring and, respectively, bearing housing), it need not be of resilient material (for example rubber), but can be of a more durable material, for example PTFE, which is not destroyed by the aggressive environment, as for example a pulp suspension. A conventional additional radial sealing 52 is provided in the embodiment shown near the bearing at the axle journal, in order to separate the oil in the bearing from the air-filled closed space 53. The suspension in the trough is indicated in FIG. 5 by the reference 54.

The dewatering means shown is only one example, and the dewatering means can thus be of a type other than the one shown. The material flow through the gap 14, for example, can be downward instead of upward. The sealing device, of course, can be provided for use in means other than dewatering means.

In the embodiment shown the sealing device is arranged so that the axle can be angled slightly in the horizontal plane. The sealing device, of course, can also be arranged so that it allows angling in other planes, depending entirely on the type of means, in which the device shall be used.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. Apparatus for dewatering or washing material suspensions comprising at least one cylindrical rotary roll including a pair of axle journals, said at least one cylindrical rotary roll separated by a predetermined gap from a second element, a trough surrounding said at least one cylindrical rotary roll, said trough including an inlet for said material suspension, an outlet for said material suspension comprising said predetermined gap, a pair of bearing housings, a pair of bearings supported by said pair of bearing housings, said pair of axle journals being mounted in said pair of bearings, said pair of bearing housings being individually movable whereby said at least one cylindrical rotary roll can be angularly displaced with respect to said pair of bearing housings, each of said pair of bearing housings including a sealing means for creating a seal between said pair of bearing housings and said pair of axle journals, said sealing means comprising a stator ring, a pair of diagonally disposed guide pins supporting said stator ring with respect to said bearing housing, whereby said stator ring can be angled in a plane with respect to said pair of guide pins, a sealing ring for creating a seal between said stator ring and said axle journal, a bellows for creating a seal between said bearing housing and said stator ring, and at least one resilient member for urging said stator ring in abutment against said sealing ring.

2. The apparatus of claim 1 wherein at least one of said at least one cylindrical rotary roll and said second element is liquid permeable.

3. The apparatus of claim 2 wherein said second element comprises a second cylindrical rotary roll.

* * * * *

UNITED STATES PATENT AND TRADEMARK OFFICE
CERTIFICATE OF CORRECTION

PATENT NO. : 7,727,133 B2
APPLICATION NO. : 10/539511
DATED : June 1, 2010
INVENTOR(S) : Jörgen T. Lundberg and Fredrik Pontén It is certified that error appears in the above-identified patent and that said Letters Patent is hereby corrected as shown below:

Column 1, line 10, after "example" insert --,--.
Column 1, line 23, "show" should read --, shows--.
Column 1, line 41, delete "use" and insert therefor --are used--.
Column 3, line 9, after "so" delete ",".

Signed and Sealed this
Thirty-first Day of May, 2011

David J. Kappos
*Director of the United States Patent and Trademark Office*